Oct. 28, 1969 W. I. LEHRER 3,475,210

LAMINATED PASSIVATING STRUCTURE

Filed May 6, 1966

INVENTOR.
WILLIAM I. LEHRER,

BY Stuart Lubitz &
Roger L. Borovoy
ATTORNEYS.

United States Patent Office 3,475,210
Patented Oct. 28, 1969

3,475,210
LAMINATED PASSIVATING STRUCTURE
William I. Lehrer, Mountain View, Calif., assignor to Fairchild Camera and Instrument Corporation, Syosset, N.Y., a corporation of Delaware
Filed May 6, 1966, Ser. No. 548,215
Int. Cl. C23c *13/02;* C23b *5/64*
U.S. Cl. 117—215 8 Claims

ABSTRACT OF THE DISCLOSURE

A coating for the surface of a solid-state device including a substrate, a base layer of a first glass-forming oxide, a top layer of a second glass-forming oxide, and an intermediate glass zone formed from the first glass-forming oxide and the second glass-forming oxide at the interface between them.

Figure 1:
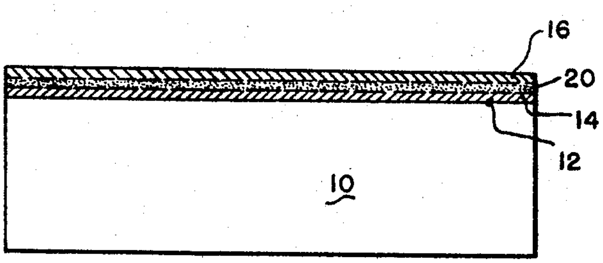

This invention relates generally to a protective coating for electronic devices. In particular, this invention pertains to a laminated protective coating for semiconductor devices and to a method for fabricating such coatings.

It is well known in the semiconductor and the thin-film arts to provide a protective coating over the surfaces of devices, to act as a diffusion barrier, to prevent contamination, and to prevent electrical shorts. Typically, monocrystalline silicon is employed as the substrate material and silicon dioxide is thermally grown to a thickness of approximately 12–15,000 A. on the substrate surface to be protected. This is described in U.S. Patent No. 3,025,-589, issued to the assignee of this invention. Another technique for providing a protective coating is the pyrolysis and vacuum deposition of an organic material which has a chemical structure containing Si-O bonds. Protective coatings deposited by this method are termed pyrolytic oxides. It is also possible to provide a protective layer by first thermally growing a thin layer of silicon dioxide and then depositing a layer of pyrolytic oxide, as described in U.S. Patent No. 3,158,505, assigned to the same assignee as this invention. By this technique, it is possible to provide a thicker protective oxide coating than is otherwise possible.

It is well known in the semiconductor art that deposited and thermally grown oxide protective coatings form an amorphous film which may contain many pinholes and other diffusion pathways. With such a structure, the effectiveness of the coating is greatly reduced. The usual method of counteracting this problem is to deposit thicker coatings of oxide on the semiconductor surface. However, this solution to the problem is not entirely satisfactory since thick coatings frequently result in crazing and cracking. The successful solution to this problem results in a protective oxide coating that is not compatible with lifting techniques that may be employed to form openings in the coating. This problem results from the impervious nature of such a thick coating. Thinner coatings of protective oxides may not be satisfactory either as masks or for lifting.

The invented protective coating is directed toward solving these prior art problems. Briefly, the invented protective coating comprises a substrate having a surface; a base layer of a first glass-forming oxide in operative relationship with respect to said substrate; a top layer of a second glass-forming oxide which layer forms an interface with the base layer removed from the substrate surface; and a glass zone intermediate the base layer and the top layer formed from the first glass-forming oxide and the second glass-forming oxide at the interface.

It has been discovered that the coating on this structure is impervious to chemical contaminants even when deposited in layers having an overall thickness of only 1500 A. Using prior art methods, thicknesses in the range of 10,000 A. to 40,000 A. would often be necessary to provide an effective protective coating. Because of the thickness of the invented cotaing, crazing problems that are usually inherent in thick coatings are eliminated.

The method of invention comprises the steps of depositing a first glass-forming oxide on a substrate surface; depositing a second glass-forming oxide over the first oxide, thereby forming an interface between the first and second oxides; heating the oxides until their interface melts; and stopping the heating to form a seal at said interface.

The novel features which are believed to be characteristic of the invention, together with further advantages thereof, will be better understood from the following descripion considered in connection with the accompanying drawing, wherein:

FIG. 1 is a sectional side view of the invented structure; and

FIGS. 2*a* to 2*d* show various steps in the invented method of producing a laminated oxide structure.

Refrering now to FIG. 1, there is shown a substrate 10 having a surface 12. Substrate 10 may be a silicon wafer but, of course, it may be any other chemically sensitive material that requires protection, such as a nickel-chromium alloy film. A base layer 14 is located atop surface 12 and is in general made from an oxide which may be referred to as a passivating oxide. This oxide is chemically inert with respect to the substrate material and is capable of forming a glass when melted in conjunction with other oxides to form a eutectic and allowed to resolidify. Some of the oxides which have demonstrated their utility for this use are aluminum oxide, silicon oxide, ceric oxide, lead oxides and vanadium oxide. It is within the scope of the invention to use any chemically inert oxide capable of being melted and of forming a glass. The thickness range over which oxide layer 14 may be varied is a function not only of the oxide used but of the type of substrate material it is placed on. In general, the thickness of oxide layer 14 may be varied within a range from as little as 500 A. to as thick as 5,000 A. When special precautions are taken, it is sometimes possible to deposit to thicknesses of 10,000 A. Two factors which limit the thickness to which oxide layer 14 can be deposited are mismatch of expansion coefficients of the oxide and the substrate material and annealing effects which take place over long periods of time. The lower limits of the thickness range are dependent only upon the ability of layer 14 to form a glass seal and to still retain a passivating layer of oxide adjacent the substrate surface.

A top layer 16 is located above base layer 14 and is separated therefrom by a formed glass zone 20. Top layer 16 is made from a glass-forming oxide-like base layer 14. The thickness range over which oxide layer 16 may vary is subject to similar limitations as those mentioned with respect to oxide layer 14. That is, the thickness to which oxide layer 16 can be deposited is a function of the oxide used and of the substrate material upon which it is deposited. Generally, the thickness of layer 16 can vary from as little as 500 A. to as much as 5,000 A. When special precautions are taken, layer 16 can be deposited to a thickness of 10,000 A. The oxides comprising layers 14 and 16 are selected on the basis of their ability to form a low temperature eutectic material at their interface. A eutectic is formed when a solution of two different materials has a melting point (i.e., eutectic melting point) lower than that of either of the two component materials separately. Thus, the two layers 14 and 16 are made from different oxides so that at their interface, they form a solid solution of the oxides which has a melting point lower than the melting point of either of the oxides separately. The selection of the oxides for layers 14 and 16 enables glass zone 20 to be formed by the application of heat. Heat is applied to layers 14 and 16 until the eutectic melting point of the mixture at the interface is attained. At that temperature the mixture of oxides at the interface liquifies. Upon cooling the liquid stratum solidifies to form a glass zone 20.

Prior to formation of glass zone 20, protective oxide layers 14 and 16 are sufficiently porous to enable lifting materials thereunder to be readily removed. When lifting techniques, such as described in U.S. patent application Ser. No. 509,825, by the same inventor and assigned to the assignee of this invention, are used in the manufacture of the semiconductor devices, cuts having a one micron (1$\mu$) width can be attained employing the above-described structure. After the etching or lifting operation is completed, heat is applied to form glass zone 20 which becomes an effective passivating layer and a seal against chemical contaminants.

It has been found that the sealing characteristics of glass zone 20 can be varied to enhance chemical resistance toward specific chemicals by the proper oxides employed in layers 14 and 16. For example, when base layer 14 is silicon oxide and top layer 16 is vanadium pentoxide, zone 20 which is a vanadium silicate glass is a particularly effective diffusion barrier against phosphorus pentoxide ($P_2O_5$) but not against $POCl_3$. However, when base layer 14 is silicon oxide and top layer 16 is titanium oxide, glass zone 20 is an effective diffusion against $POCl_3$ but crazes when used against $P_2O_5$. Thus, the invented structure may readily be employed to form various diffusion barriers.

It is also within the scope of the invention to provide more than two oxide layers. With three oxide layers, two interfaces are formed which, upon melting and resolidification, are capable of forming two glass zones. This enhances the sealing characteristic of the laminated oxide structure because of the multiplicity of glass zones. It is within the scope of this embodiment to select the oxide layers in such a manner that one glass seal is an effective barrier toward one specific chemical, such as $P_2O_5$, while the other glass zone is an effective barrier toward another specific chemical, such as $POCl_3$. The overall effect of such a laminated structure being a high degree of imperviousness toward most chemical contaminants likely to be encountered in semiconductor process operations.

To further illustrate the sealing and protective properties of the laminated oxide passive structure, the following example is given:

Two 300 ohm/sq. cm. nickel-chromium alloy films less than 200 A. thick received a coating comprising a layer of $SiO_x/V_2O_5$. The overall thickness of the laminated oxide coating was approximately 1,500 A. total. The nickel-chromium films were subjected to the following conditions resulting in the changes noted:

500° C./oxygen/1 hour±3.54% change in resistance.
500° C./air/15 hours−12.10% change in resistance.

In comparison, for unprotected films at 300° C./oxygen/>+50% change in resistance was noted within a 1-hour period.

Another advantage of the described structure is the ability to provide relatively thin yet highly effective protective or diffusion barriers. However, thicknesses of 20,000 A. may be formed and multiple-seal arrangements may be included. In addition, the structure is particularly useful when used in conjunction with the lifting technique of manufacturing semiconductor devices.

Figures 2A, 2B, 2C, 2D:
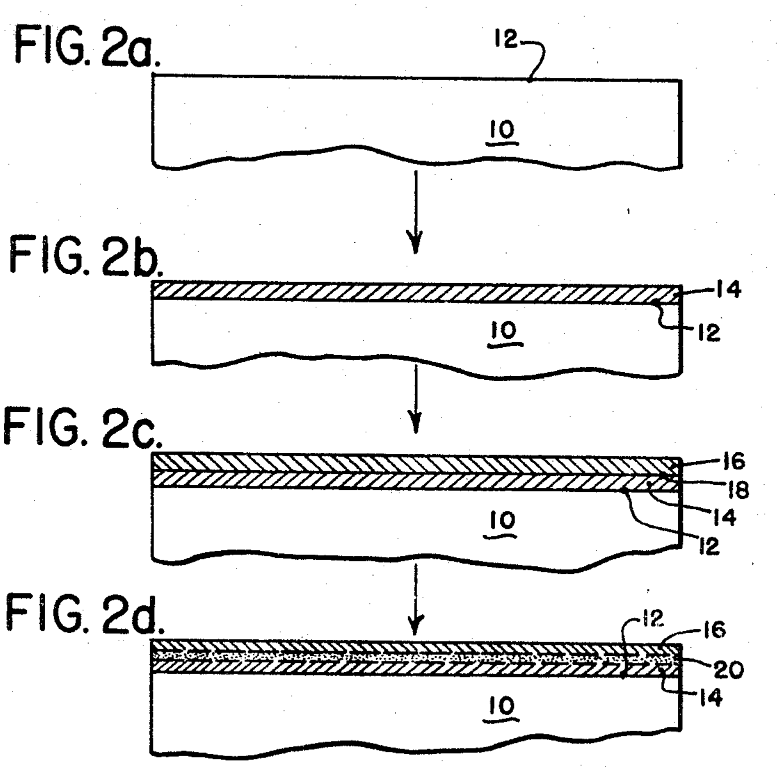

Referring now to FIGS. 2*a* to 2*d*, the method of this invention will now be described. First, base layer 14 of oxide is vacuum evaporated and deposited upon surface 12 of substrate 10 (FIG. 2*a*). Base layer 14 must be chemically non-reactive with substrate surface 12. Base layer 14 must also be capable of melting and of forming a glass when allowed to resolidify. Typically, oxides such as vanadium oxide ($V_2O_5$), aluminum oxide ($Al_2O_3$), lead oxide (PbO), silicon oxide ($SiO_x$) and ceric oxide ($CeO_2$) can be used to form base layer 14 (FIG. 2*b*).

Next, top layer 16 is vacuum evaporated and deposited over layer 14, thereby forming an interface 18 between the two layer (FIG. 2*c*). The oxide comprising layer 16 is selected on the basis of its ability to form a low-temperature eutectic with the oxide of layer 14, and also on the basis of its ability to form a glass when melted and allowed to resolidify. Typical oxides may be lead oxide (PbO), bismuth oxide ($Bi_2O_3$) or boron oxide ($B_2O_3$).

Subsequent to vacuum evaporating and depositing layers 14 and 16, consecutively, onto substrate surface 12, sufficient heat is applied to the structure to melt oxide interface 18. It is an important feature of this invention that the temperature required to melt base layer 14 and top layer 16 at their interface is substantially lower than the temperature required to melt either of the oxide layers alone. This is believed to be a result of the formation of a low-temperature eutectic at the interface 18 of the two layers. The temperature required to melt the mixture of oxides at their interface in the practice of this invention is generally lower than 650° C. This feature is particularly important in those instances in which temperatures higher than 650° C. would damage or adversely affect the substrate material or the components therein. An example of such an instance is in the coating of very thin films of nickel-chromium alloys. At temperatures of above 650° C., agglomeration of the film occurs, thereby detrimentally changing its electrical characteristics. However, in many applications higher eutectic melting point temperatures can be tolerated. Thus, the proper selection of oxide layers 14 and 16 will determine the temperature of formation of the resulting eutectic. For example, the following oxide combinations result in the indicated eutectic formation temperature:

| | Approx. ° C. |
|---|---|
| Lead oxide (PbO)/boron oxide ($B_2O_3$) | 497 |
| Lead oxide (PbO)/vanadium ovide ($V_2O_5$) | 485 |
| Silicon oxide ($SiO_x$)/lead oxide (PbO) | 700 |
| Aluminum oxide ($Al_2O_5$)/vanadium oxide ($V_2O_5$) | 640 |

Upon allowing the melted region to cool and thereby to resolidify, a glass zone 20 is formed intermediate oxide layer 14 and oxide layer 16 (FIG. 2*d*). This glass zone is a slab and acts as an effective diffusion barrier and as a protective layer against the various chemical contaminants encountered during subsequent processing operations and thereafter. As stated above, the effectiveness of zone 20 as a diffusion barrier, can be varied as to specific chemical contaminants by the proper selection of oxides comprising layers 14 and 16.

It is within the scope of the invention to repeat the above steps so that another layer is vacuum deposited over layer 16 and another glass zone is formed. The forming of the successive seals may be accomplished in sequence or there may be forming, lifting or other processes performed prior to the forming of the second or third seal.

What is claimed is:

1. A solid-state device having a coating thereon comprising:

a base layer of a first glass-forming oxide on at least a portion of a surface of the device;

a top layer of a second glass-forming oxide, different from said first glass-forming oxide, which layer forms an interface with said base layer, said interface being removed from the surface; and said interface constituting a glass zone intermediate said base layer and said top layer formed from said first glass-forming oxide and said second glass-forming oxide, said first and second glass-forming oxides each being selected such that said interface melting point is substantially below the melting point of said first glass-forming oxide and substantially below the melting point of said second glass-forming oxide.

2. The device of claim 1 wherein said interface melting point is less than approximately 900° C.

3. The device of claim 1, wherein the surface over which the coating is located comprises silicon or a film material of a nickel-chromium alloy.

4. The device of claim 1, wherein said base layer is selected from the group consisting of silicon oxide, aluminum oxide, lead oxide, vanadium pentoxide, and ceric oxide, and wherein said top layer is selected from the group consisting of vanadium oxide, titanium oxide, boron oxide, bismuth oxide, and lead oxide, said base layer being of a different oxide from said top layer.

5. A method for forming a laminated structure on a surface of a solid-state device comprising the steps of:

depositing a first glass-forming oxide on a surface of the device;

depositing a second glass-forming oxide different from said first glass-forming oxide, over said first oxide thereby forming an interface between said first and second oxides, said first and second glass-forming oxides each being selected such that said interface melting point is substantially below the melting point of said first glass-forming oxide and substantially below the melting point of said second glass-forming oxide, heating said oxides until said interface melts; and stopping said heating to form a seal at said interface.

6. The method of forming the laminated oxide structure of claim 5, wherein heating said interface is carried out at a temperature substantially below the melting point of the first glass-forming oxide and substantially below the melting point of the second glass-forming oxide.

7. The method of forming a laminated structure of claim 5, wherein the steps of said method are repeated at least twice thereby forming a laminated structure having at least two seals.

8. The method of claim 5 wherein the device surface upon which the coating is located comprises silicon or a film material of a nickel-chromium alloy.

References Cited

UNITED STATES PATENTS

| | | | |
|---|---|---|---|
| 3,176,679 | 5/1965 | Langley. | |
| 3,239,376 | 3/1966 | Schmidt | 117—212 |

ALFRED L. LEAVITT, Primary Examiner

C. K. WEIFFENBACH, Assistant Examiner

U.S. Cl. X.R.

117—70, 106